United States Patent [19]
Lang

[11] Patent Number: 5,660,247
[45] Date of Patent: Aug. 26, 1997

[54] RACK SERVO-STEERING, PARTICULARLY FOR MOTOR VEHICLES

[75] Inventor: Armin Lang, Schwäbisch Gmünd, Germany

[73] Assignee: ZF Friedrichshafen AG, Friedrichshafen, Germany

[21] Appl. No.: 507,511

[22] PCT Filed: Feb. 22, 1994

[86] PCT No.: PCT/EP94/00499

§ 371 Date: Aug. 23, 1995

§ 102(e) Date: Aug. 23, 1995

[87] PCT Pub. No.: WO94/19226

PCT Pub. Date: Sep. 1, 1994

[30] Foreign Application Priority Data

Feb. 26, 1993 [DE] Germany .......................... 43 05 932.5

[51] Int. Cl.⁶ ...................................................... B62D 5/22
[52] U.S. Cl. .......................... 180/421; 180/428; 180/441; 137/596.1; 137/627.5; 91/375 A
[58] Field of Search .................... 180/417, 421 O, 180/426, 427, 428, 441; 137/596.1, 627.5; 91/375 A

[56] References Cited

U.S. PATENT DOCUMENTS

| 3,750,836 | 8/1973 | Kristof . | |
|---|---|---|---|
| 4,607,717 | 8/1986 | Nakayama | 180/421 |
| 5,028,851 | 7/1991 | Wilder | 180/441 X |
| 5,529,137 | 6/1996 | Lang | 180/417 |

FOREIGN PATENT DOCUMENTS

| 41 26 020 | 2/1993 | Germany . |
| 662724 | 12/1951 | United Kingdom . |
| 1590515 | 6/1981 | United Kingdom . |
| WO85/01924 | 5/1985 | WIPO . |
| WO93/02904 | 2/1993 | WIPO . |

*Primary Examiner*—Victor E. Johnson
*Attorney, Agent, or Firm*—Davis and Bujold

[57] ABSTRACT

In a servo-steering unit provided for motor vehicles, one pinion (2) supported in a steering housing (1) meshes with a rack (6). A steering valve (8) which serves to control the pressurized fluid for the servo-steering unit has two inlet seat valves (10, 11) and two outlet seat valves (12, 13) the closing members of which are movable via actuating tappets depending upon rotation of a steering spindle. The outlet seat valves (12, 13) are open in the neutral position of the steering valve. The inlet seat valves (10, 11) are actuatable in a closing direction by the force of pressure springs and are opened only after closing of the respective outlet seat valve (12, 13). A limiting piston (31) is provided for each side of the steering valve (8). Each limiting piston (31) is actuated on one side by one of the centering springs (30) and by a first pressure prevailing in a working chamber of a servo-motor and on the other side by a limiting force. In the neutral position of the steering valve (8) the limiting force is stronger than the force of the centering spring (30) so that the limiting piston (31) abuts against a stop shoulder in the neutral position of the steering valve (8). An "interception" or "actuating torque limitation" is obtained with such an arrangement.

11 Claims, 5 Drawing Sheets

RACK SERVO-STEERING, PARTICULARLY FOR MOTOR VEHICLES

The invention concerns a servo-steering unit for motor vehicles. The servo-steering unit includes a steering valve which has two inlet seat valves and two outlet seat valves the closing members of which are movable by actuating tappets against the force of centering springs depending on a rotation of a steering spindle. The closing members of the inlet seat valves are here actuatable in a closing direction by the force of pressure springs so that the inlet seat valves are closed in the neutral position of the steering valve. The outlet seat valves are open in the neutral position of the steering valve. The inlet seat valves do not open until the respective outlet seat valve closes.

BACKGROUND OF THE INVENTION

Such a servo-steering unit with closed center has been disclosed in DE-A1-41 26 020. That kind of servo-steering unit has a linear course of a characteristic line. This means that, in case of elevated servo pressures, that actuating torque can greatly increase.

However, in the servo-steering units with an open center used at present it is customary, starting from a specific pressure in the servomotor, once again to increase slightly the actuating torque. This means that starting from said specific point the characteristic line extends more abruptly. This effect is called "interception" or "actuating-torque limitation".

SUMMARY OF THE INVENTION

The problem on which the invention is based is to improve a servo-steering unit according to the preamble, that is, a servo-steering unit with closed center, in a manner such that with the steering valve thereof characteristic lines can be produced which in their shape approximate as much as possible the characteristic lines of servo-steering units with an open center used at present. The solution particularly results from a limiting piston being provided for each side of the steering valve which is actuated on one side by one of the centering springs and by the first pressure prevailing in a working chamber of a servomotor and on the other side by a limiting force. The limiting force, in the neutral position of the steering valve, is greater than the force of the centering springs so that the limiting piston abuts against a shoulder of a housing that contains the steering valve. Thereby, starting from a specific servopressure, the mechanical centering forces of the steering valve are reduced.

Convenient and advantageous embodiments of the invention are provided in the sub-claims. But the invention is not limited to the combination of features of the claims. Other logical possible combinations of claims and separate features of the claims result for the expert depending on the existing problem.

The limiting force can be produced by a limiting spring and/or a second pressure extracted from an accumulator and acting in a limiting chamber.

If only one limiting spring is used to produce the limiting force, then the pre-load force of said spring must be greater than the force of the centering spring. It is then convenient, by means of a passage bore in the actuating tappet, to connect the limiting chamber actuated by the reverse pressure with the tank of pressurized fluid. For said purpose, the actuating tappet has a coaxial extension which is snugly passed through the limiting piston.

If, on the contrary, importance is attached to smaller dimensions of the springs and, in particular, it is going to be prevented that the limiting springs have to be designed stronger than the centering springs, then the limiting chamber is actuated by a second pressure produced by a pressure-reducing valve from the pressure prevailing in an accumulator. The limiting springs can be completely eliminated in theory by adequate selection of said pressure. Besides, it is possible with said arrangement, by an adequate electronic control, to change said pressure, for instance, depending on the speed of the vehicle or other travel parameters such as the wheel skid and thus to produce a reaction force dependent on speed or another parameter.

If a specific, firmly defined pressure is desired for producing just the limiting force, then the pressure-reducing valve can be eliminated if an auxiliary piston actuated by the accumulator pressure acts upon the limiting piston. The auxiliary piston has a smaller diameter than the limiting piston.

According to another embodiment, the extension must carry a stop disc by which the actuating tappet is taken along by the limiting piston after a certain displacement thereof. It is thus possible, when the pre-load force of the centering spring has been consumed, to transmit the increasing hydraulic force on the limiting position to relieve the actuating device acting upon the actuating tappet.

If the hydraulic forces acting upon the stop disc become too great, said forces can be reduced by the fact that the closing member of the inlet seat valve, after a certain displacement of the limiting piston, is taken along by a movable sleeve situated between said two parts.

In case of failing continuous pressure, replenishing valves are needed to ensure a good filling of the servomotor also in a servo-steering unit with a closed center. Said replenishing valves can be very easily disposed in the limiting piston without added construction expenses.

BRIEF DESCRIPTION OF THE DRAWINGS

The invention is explained in detail herebelow with reference to several embodiments shown in the drawings. For the sake of simplicity, the invention is described with reference to a rack-and-pinion servo-steering unit. But the invention can also be used in other servo-steering units such as ball-and-nut servo-steering units. In the drawings.

DESCRIPTION OF THE PREFERRED EMBODIMENT(S)

Figure 1:
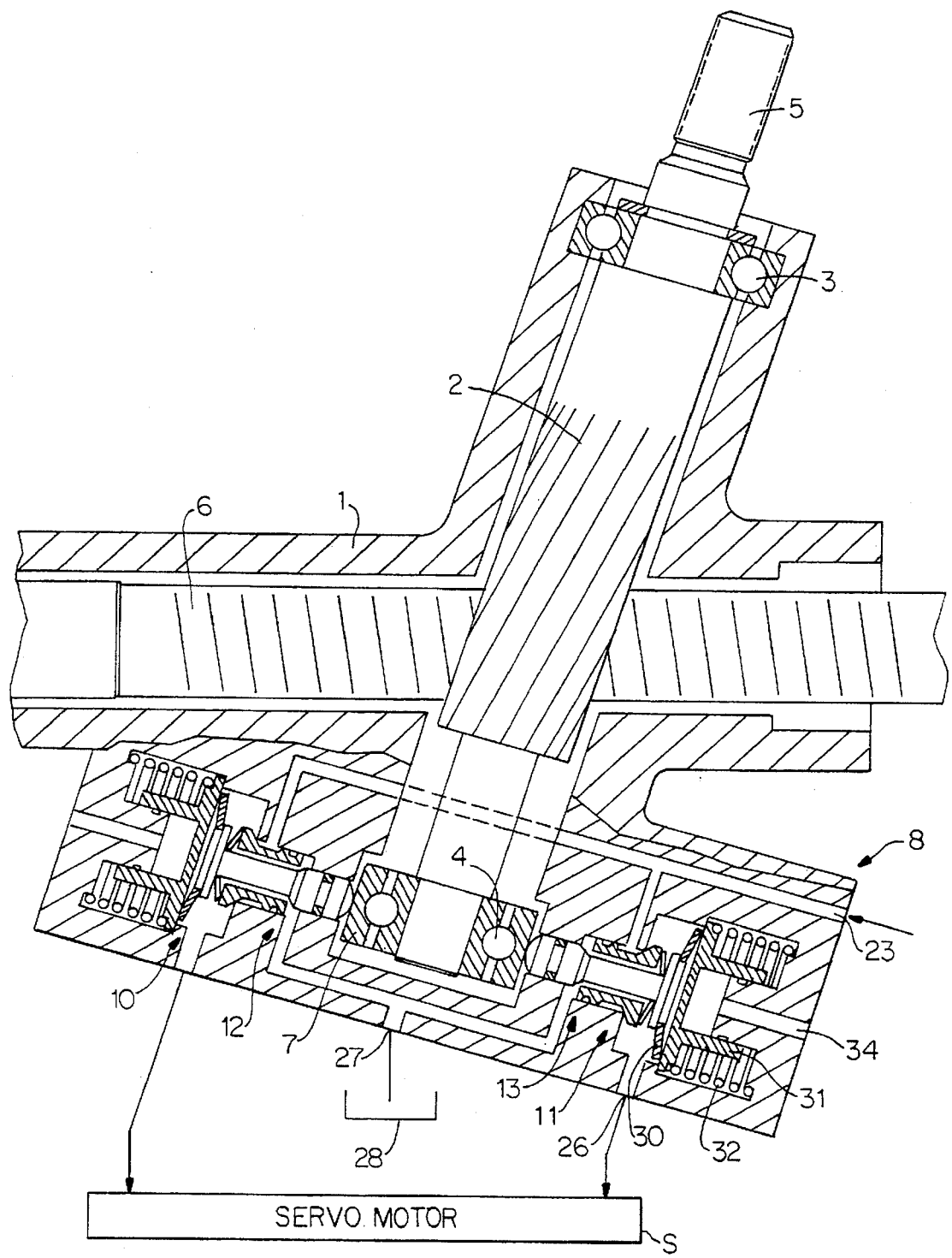
FIG. 1 shows in a first embodiment a longitudinal section through the servo-steering unit of the invention.

One pinion 2 is rotatably supported, in a steering housing 1, on two bearings 3 and 4. The pinion 2 carries a steering spindle connection 5, at one end, for attachment to a steering element, such as a steering spindle with a hand wheel not shown. One of the bearings, preferably the bearing 3 which lies in proximity to the steering-spindle connection 5, is designed as fixed bearing. The other bearing, preferably the bearing 4 remote from the steering-spindle connection 5, is designed as idler bearing. The pinion 2 meshes, via its gearing, with a rack 6 which is axially movably passed into the steering housing 1. The outer ring 7 of the bearing 4 is passed into the steering housing 1 so as to be able to move without friction depending on the movement of the lower part of the pinion 2 and perpendicular to the axis thereof. The importance of said movement will be explained in the course of the specification.

The pressurized fluid conveyed by a servopump, not shown, and conveniently stored in an accumulator is directed by a steering valve 8 to and from the pressure chambers of a servomotor S. The steering valve 8 contains two inlet seat valves 10 and 11 and two outlet seat valves 12 and 13. The inlet and outlet seat valves 10, 11, 12 and 13 are situated substantially perpendicular to the axis of the pinion 2 in the area of the idler bearing 4. An inlet seat valve 10 or 11 and an outlet seat valve 12 or 13 are respectively placed coaxially with one another.

Both parts of the steering valve 8, each having an inlet seat valve 10 or 11 and an outlet seat valve 12 or 13, are designed substantially alike. Therefore, the precise construction of the steering valve 8 will be described herebelow with reference to only one part—the part to the right of FIG. 1—of the steering valve 8 with the inlet seat valve 11 and the outlet seat valve 13 with the aid of the enlarged segment shown in FIG. 2.

In the neutral position of the steering valve 8, the inlet seat valve 11 is closed. This occurs by the fact that the closing member 14 thereof is actuatable in a closing direction against a valve seat 16 fixed to the housing by the force of a pressure spring 15 in the form of a plate spring. The pressure spring 15 rests, on one side, against the closing member 14 and, on the other, on a part 17 of an actuating tappet. The part 17 of the actuating tappet 18 has a collar 20 and passes through a bore of the closing member 14 and is fastened to the actuating tappet 18 proper. A closing member 21, of the outlet seat valve 13, which interacts with a valve seat 22 situated on the closing member 14 is formed on the actuating tappet 18.

An input connection 23 is provided to supply the unit with pressurized fluid conveyed by the servopump. Said input connection 23 communicates, via corresponding ducts, with an input chamber 24 situated by the inlet seat valve 10. A chamber 25 which, in the neutral position of the steering valve 8, is separated from the input chamber 24 and communicates with a cylinder connection 26. In addition, the chamber 25 communicates with a reverse flow connection 27 and thus with a pressurized-fluid tank 28 by openings, not shown, in the closing member 14 via the outlet seat valve 13 open in a neutral position of the steering valve 8.

A centering spring 30, which holds the actuating tappet 18 in abutment against the outer ring 7 of the bearing 4, acts upon the actuating tappet 18. The centering spring 30 is designed as plate spring, in the embodiment of FIG. 2, and as coil spring, in the embodiment of FIG. 3. It rests on one side on the collar 20 of the actuating tappet 18 and on the other side on a limiting piston 31.

From the above description, it results that the limiting piston 31 is actuated, on one side facing the inlet seat valve 11, firstly by the centering spring 30 and secondly by the first pressure prevailing in the chamber 25. Since the chamber 25 is connected with the cylinder connection 26, said first pressure corresponds to the working pressure in a working chamber of the servomotor. On the side remote from the inlet seat valve 11, the limiting piston 31 is actuated by a limiting force which is produced by a limiting spring 32 and/or by a second pressure.

Figure 2:
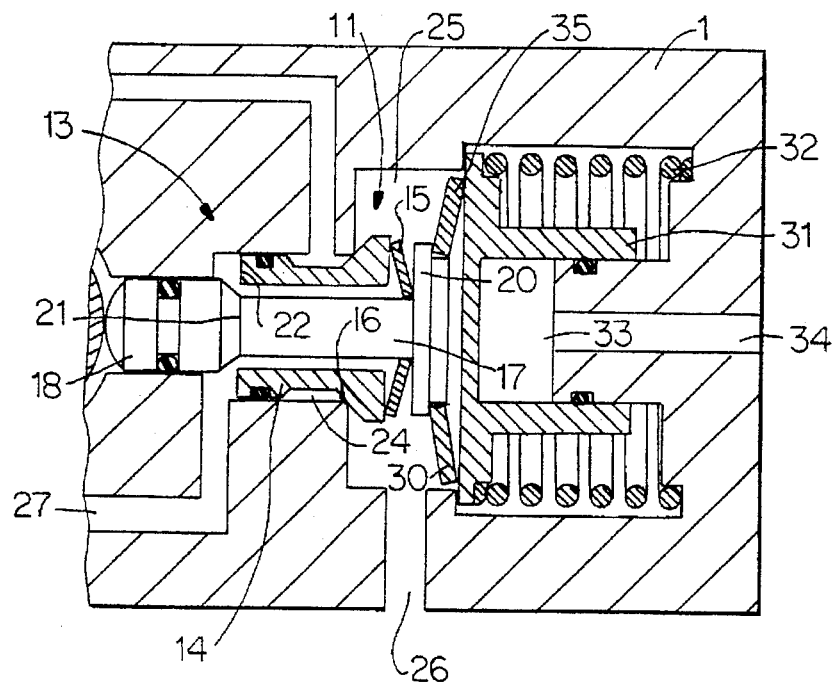
FIG. 2 is an enlarged partial longitudinal view of the right side portion of the steering valve of FIG. 1.

Only the limiting spring 32 is active in the embodiment of FIGS. 1 and 2. The pressure in a limiting chamber 33, which adjoins the limiting piston 31, corresponds to the return pressure prevailing in the pressurized-fluid tank 28. For this purpose, the limiting chamber 33 is connected with the pressurized-fluid tank 28 by a pipe 34 only generally indicated.

The limiting spring 32 is pre-loaded via a stop shoulder 35 in the steering housing 1. In order that the limiting piston 31 abuts with certainty against the stop shoulder 25 in the neutral position of the steering valve 8, the pre-load force of the limiting spring 32 in the pressureless state must be greater than the force of the centering spring 30.

The operation of the servo-steering unit according to the invention is described herebelow: If a revolution of the steering hand wheel, not shown, causes the pinion 2 to rotate, for instance, counterclockwise, then the gearing of the pinion 2 rolls first on the gearing of the rack 6 which is momentarily still stationary. Thereby the pinion 2 is swung around the fixed bearing 3 by a very small angle. The idler bearing 4 is moved to the right. Said movement is transmitted via the outer ring 7 of the idler bearing 4 to the actuating tappet 18 and thus to the closing member 21 of the outlet seat valve 13. In FIG. 2, the closing member 21 is moved to the right against the force of the centering spring 30 until abutting against the valve seat 22 and thus the communication of the cylinder connection 26 with the pressurized-fluid tank 28 is interrupted. Up to this point of the movement, the pressure spring 15 acts upon the closing member 14 of the inlet seat valve 11 so that the latter remains closed. The compression and position of installation of the pressure spring 15 are designed, in such a manner, that in the neutral position of the steering valve 8 it exerts a closing force upon the closing member 14, that said closing force diminishes as the movement of the actuating tappet 18 increases and that the pressure spring 15, at the moment the closing member 21 consistently strikes against the valve seat 22, abuts once more without applying force on the closing member 14. During the further movement of the actuating tappet 18, the closing member 14 will accordingly move from its valve seat 16 so as to create a communication of the input connection 23 to the cylinder connection 26 via the input chamber 24 and the chamber 25. A corresponding pressure builds up, which in a manner known per se, holds the balance in the sense of a hydraulic reaction of the actuating force on the actuating tappet 18.

At this point in time, first the force of the centering spring 30 and secondly the force of the first pressure prevailing in the chamber 25, which corresponds to the working pressure, are accordingly acting upon the actuating tappet 18. Said two forces act likewise upon the limiting piston 31.

Starting from a certain point of the movement of the actuating tappet 18 and thus from a certain strength of the forces acting upon the limiting piston 31, the preload force of the limiting spring 32 will prevail. The limiting piston 31 is moved to the right whereby the force of the centering spring 30 diminishes. Thereby diminishes the further increase of force upon the actuating tappet 18 and thus indirectly upon the steering hand wheel.

Figure 3:
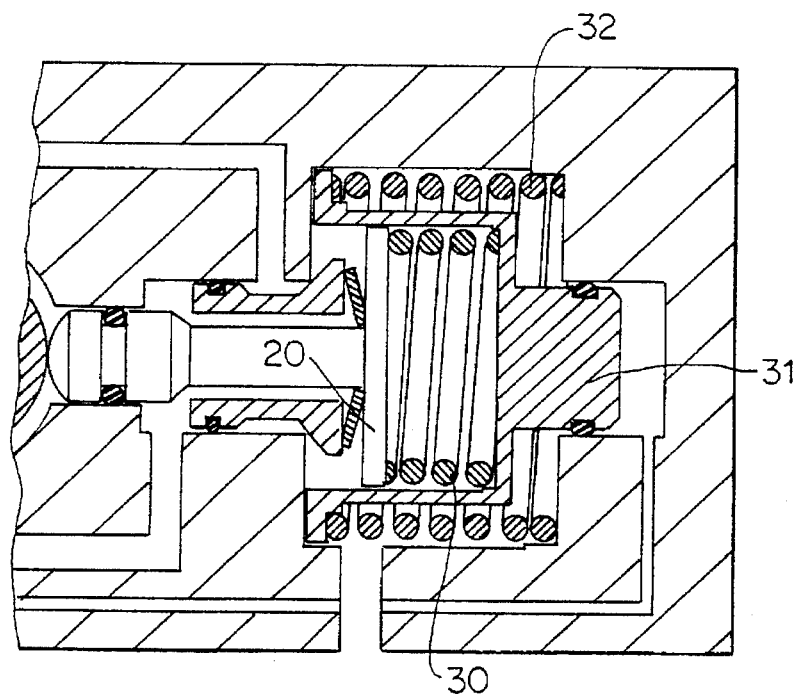
FIG. 3 is an enlarged partial longitudinal view of the right side portion of a second embodiment of a steering valve according to the present invention.

The features of the other embodiments are described in detail herebelow:

The embodiments of FIGS. 2 and 3 substantially differ by the different design of the centering spring 30, as has already been described.

In the embodiment of FIG. 3, the centering spring 30 and the limiting spring 32 overlap.

Figure 4:
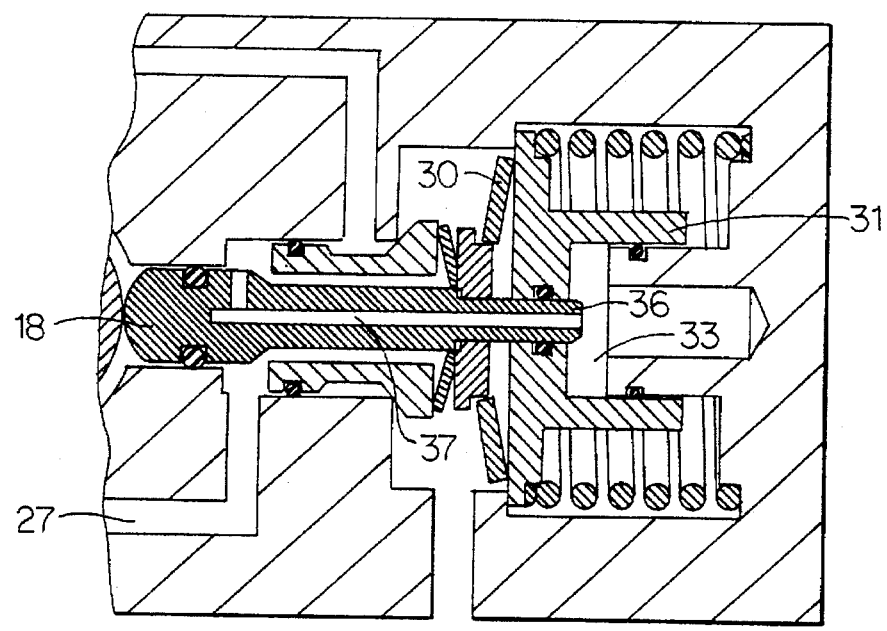
FIG. 4 is an enlarged partial longitudinal view of the right side portion of a third embodiment of a steering valve according to the present invention.

The embodiment of FIG. 4 shows a sample possibility of how the limiting chamber 33 can be connected with the reverse connection 27. For this purpose, the actuating tappet 18 is provided with a coaxial extension 36 which is snugly passed through the limiting piston 31. A through hole 37, which connects the limiting chamber 33 with the reverse connection 27, passes through the actuating tappet 18 and the extension 36.

Figure 5:
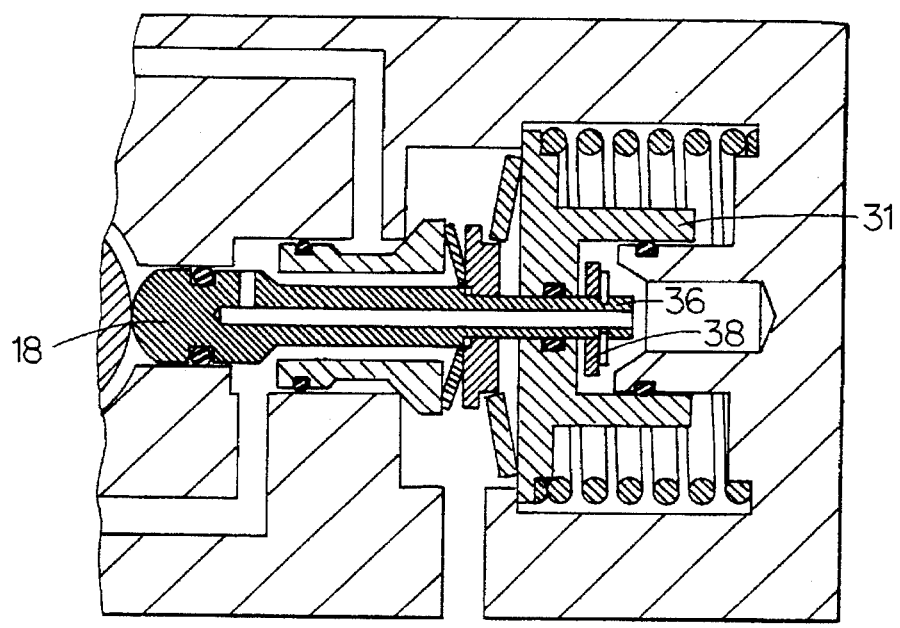
FIG. 5 is an enlarged partial longitudinal view of the right side portion of a fourth embodiment of a steering valve according to the present invention.

In the embodiment of FIG. 5 is shown how after the pre-load force of the centering spring 30 has been consumed, the hydraulic force acting upon the limiting piston 31 can be transmitted to the actuating tappet 18. If on the extension 36 a stop disc 38 is actually fastened, then after a certain movement of the limiting piston 31 the actuating tappet 18 is taken along and removed from the actuating device, that is, from the outer ring 7 of the bearing 4. The steering hand wheel is thus further relieved.

Figure 6:
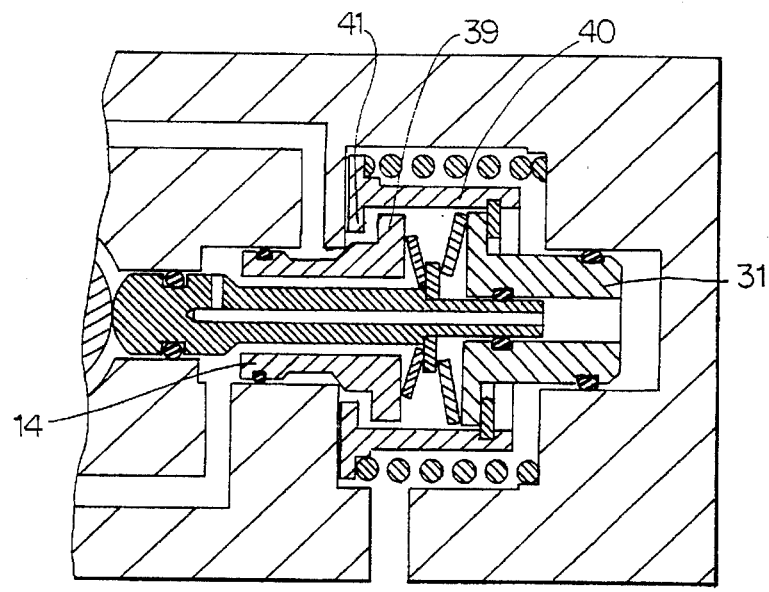
FIG. 6 is an enlarged partial longitudinal view of the right side portion of a fifth embodiment of a steering valve according to the present invention.

Another possibility for relieving the actuating tappet 18 and therewith the actuating element and the steering hand wheel is shown in FIG. 6. A movable sleeve 40, by which the closing member 14 of the inlet seat valve 11 is taken along after a certain displacement of the limiting piston 31, is situated coaxially with the limiting piston 31. The sleeve 40 carries a collar which meshes in a collar 39 of the closing member 14.

Figure 7:
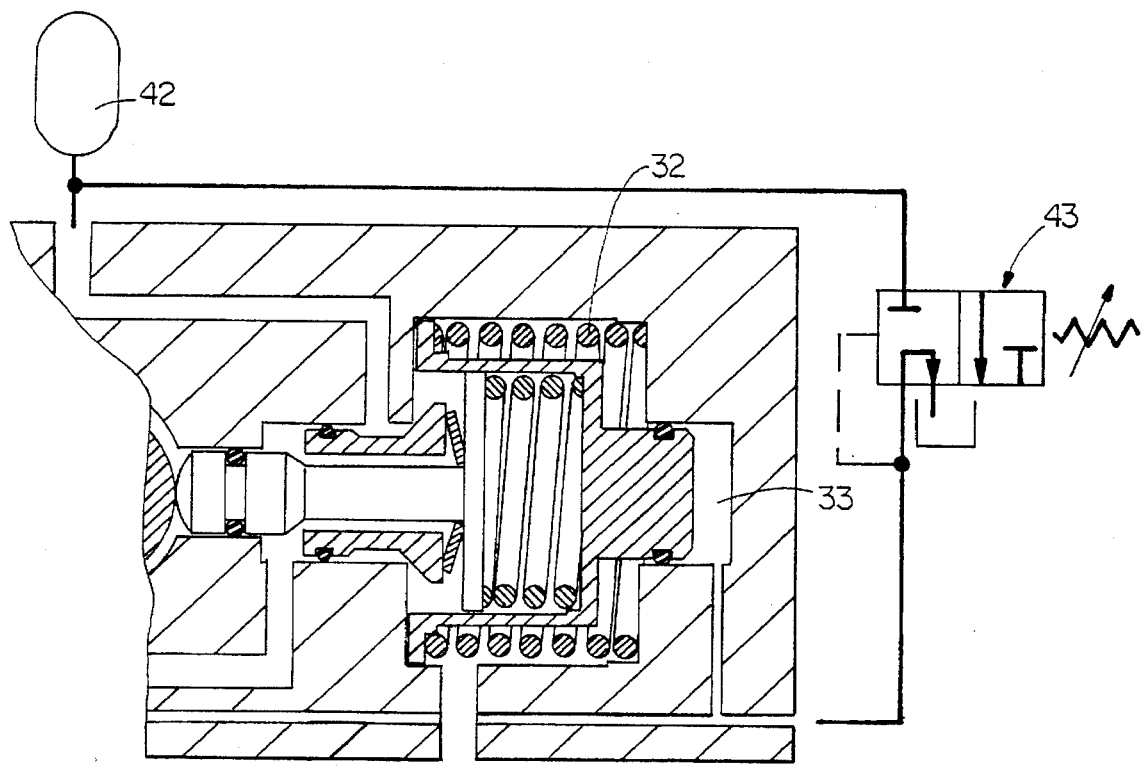
FIG. 7 is an enlarged partial longitudinal view of the right side portion of a sixth embodiment of a steering valve according to the present invention.

In the above embodiments, the pre-load force of the limiting spring 32 in the neutral position of the steering valve 8 must be greater than the force of the centering spring 30. In the embodiment of FIG. 7 is shown a possibility of how to eliminate the excess of force of the limiting spring 32 compared to the centering spring 30. For this purpose, the limiting chamber 33 is actuated not with reverse pressure but with a specific, adjustable or regulatable pressure. Said pressure is produced in a simple manner by connecting the accumulator already mentioned, now designated with 42, with the limiting chamber 33 via a pressure-reducing valve 43. By an adequately selected level of pressure, the limiting spring 32 can be greatly reduced and optionally even omitted altogether. By an adequate electronic regulation, the pressure can be varied via the pressure-reducing valve 43, for instance, depending on the speed of the vehicle.

Figure 8:
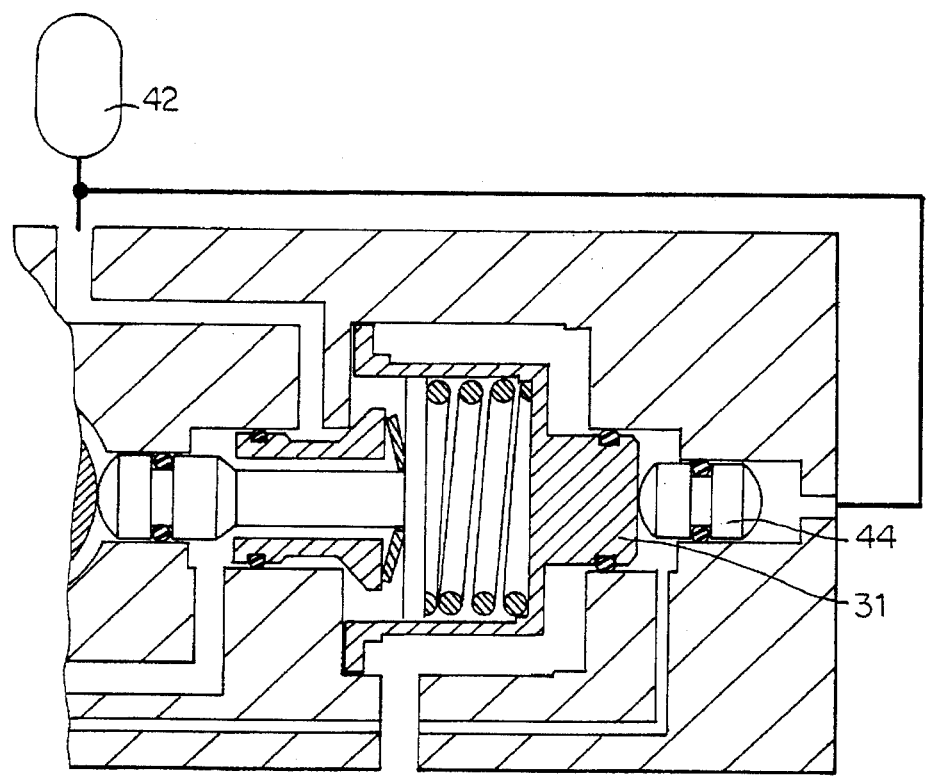
FIG. 8 is an enlarged partial longitudinal view of the right side portion of a seventh of a steering valve according to the present invention.

If the limiting spring is to be absolutely eliminated and the pressure in the limiting chamber 33 not changeable, then the pressure from the accumulator 42 is passed directly to an auxiliary piston 44 (FIG. 8). The auxiliary piston 44 acts upon the limiting piston 31. The diameter of the auxiliary piston 44 is smaller than the diameter of the limiting piston 31.

Figure 9:
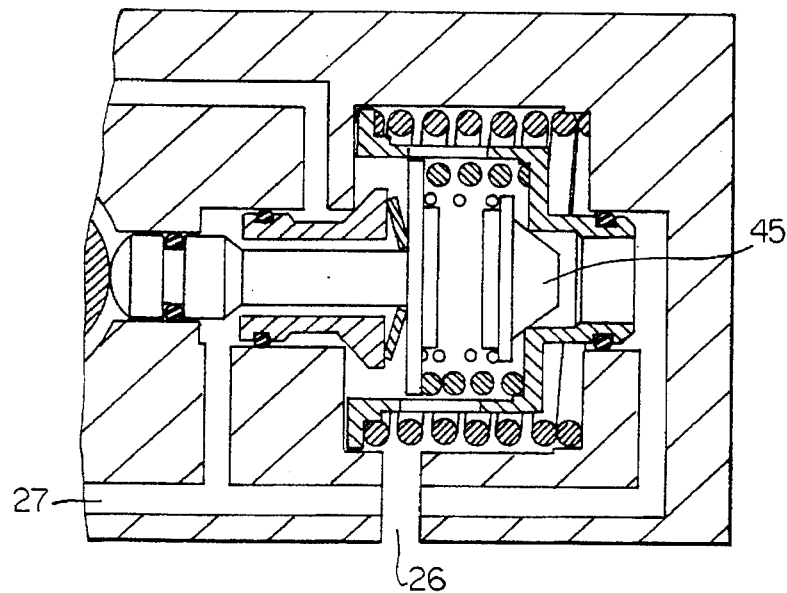
FIG. 9 is an enlarged partial longitudinal view of the right side portion of an eighth embodiment of a steering valve according to the present invention.

In the embodiment of FIG. 9, a replenishing valve 45 is integrated in the limiting piston 31. Thereby a good filling of the working chambers of the servomotor is ensured in case of failing continuous pressure by producing a communication of the reverse connection to the cylinder connection 26 via the replenishing valve 45.

I claim:

1. A servo-steering unit having a steering valve, a housing receiving a steering spindle, and two steering valve components located within the housing, each of said two steering valve components comprising:

a respective inlet seat valve having a respective first closing member;

a respective outlet seat valve having a respective second closing member;

a respective actuating tappet controlling movement, depending on rotation of said steering spindle, of said respective first and said respective second closing members to one of an opened and a closed position;

a respective centering spring biasing said respective actuating tappet toward a neutral position of said steering valve in which said respective first closing member of said respective inlet seat valve is in said closed position and said respective second closing member of said respective outlet seat valve is in said opened position; and said respective first closing member being movable from the closed position to the opened position only once said respective second closing member has moved to the closed position;

wherein each steering valve component has a respective limiting piston, each said limiting piston is actuated, on one side, by one said respective centering spring and by a first pressure prevailing in a respective working chamber of a servo-motor and, on the other side, by a respective limiting force; and said respective limiting force, in said neutral position of said steering valve, is greater than a force of said respective centering spring; and each said limiting piston, in said neutral position of said steering valve, abuts against a respective stop shoulder of said steering housing.

2. A servo-steering unit according to claim 1, wherein each said limiting piston has a cross section which is smaller than an effective cross section of said respective first closing member.

3. A servo-steering unit according to claim 1, wherein each said limiting force is produced by a respective limiting spring, accommodated within said housing, having a pre-load force which is greater than said force of said respective centering spring when said steering valve is in said neutral position.

4. A servo-steering unit according to claim 1, wherein said servo-steering unit includes a respective accumulator coupled to the other side of said respective limiting piston and each said limiting force is produced by a pressure prevailing in said respective accumulator.

5. A servo-steering unit according to claim 4, wherein a respective pressure-reducing valve is located between said respective accumulator and the other side of said respective limiting piston to control a magnitude of said limiting force.

6. A servo-steering unit according to claim 5, wherein each said pressure-reducing valve is adapted to be regulatable depending on a speed of a vehicle incorporating said servo-steering unit.

7. A servo-steering unit according to claim 4, wherein each said limiting force is transmitted via a respective auxiliary piston abutting against the other side of said respective limiting piston, and said respective auxiliary piston has a diameter which is smaller than a diameter of said respective limiting piston.

8. A servo-steering unit according to claim 4, wherein each said actuating tappet has a coaxial extension which extends through said respective limiting piston to a respective limiting chamber; and each said actuating tappet and said extension has a respective through hole which extends therethrough by which said respective limiting chamber is connected with a tank containing a pressurized fluid.

9. A servo-steering unit according to claim 8, wherein each said extension carries a respective stop disc by which said respective actuating tappet is movable by said respective limiting piston after a desired displacement of said respective limiting piston.

10. A servo-steering unit according to claim 1, wherein a respective sleeve is supported by and movable together with each said limiting piston, and each said sleeve moves said respective closing member of said respective inlet seat valve to the opened position after a desired displacement of said respective limiting piston.

11. A servo-steering unit according to claim 3, wherein each said limiting piston includes a respective replenishing valve via which the respective working chamber of said servomotor is connectable with a pressurized-fluid tank.

* * * * *